March 17, 1936.  C. HARTLINE  2,034,432
CLEARANCE LAMP
Filed April 16, 1935
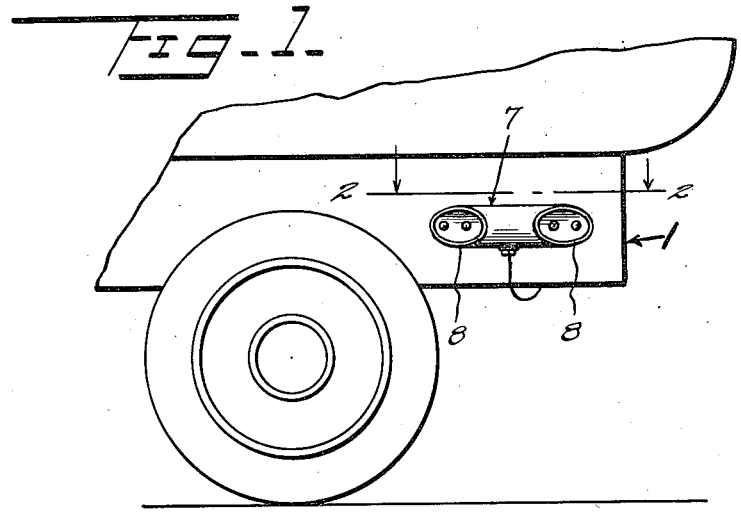
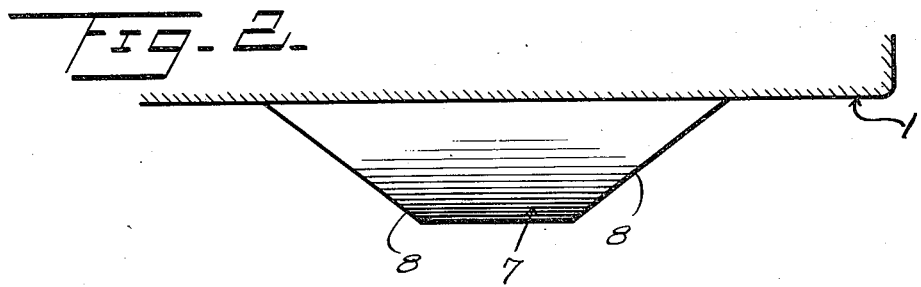
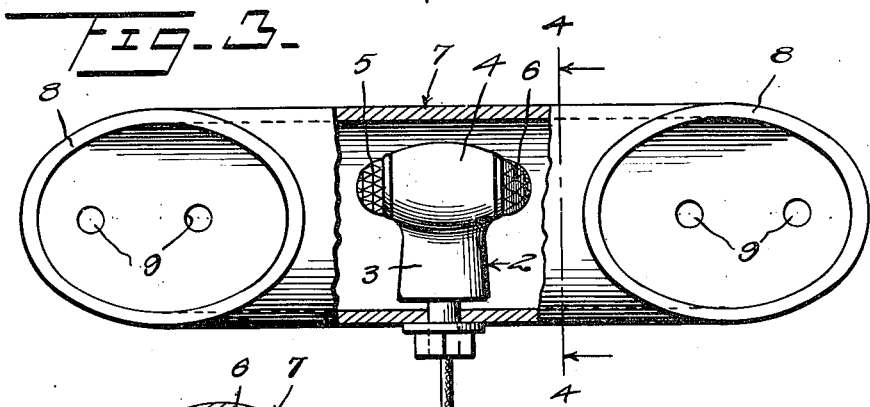
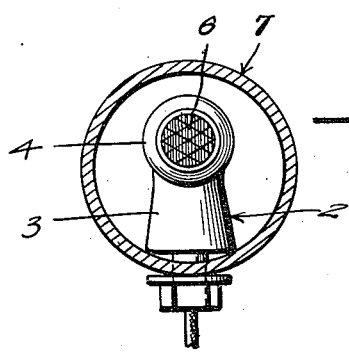
Inventor
Clyde Hartline
By Watson E. Coleman
Attorney Patented Mar. 17, 1936

2,034,432

UNITED STATES PATENT OFFICE 2,034,432

CLEARANCE LAMP

Clyde Hartline, New Orleans, La., assignor to Hartline Clearance Lamp Co. Inc., New Orleans, La., a corporation of Louisiana Application April 16, 1935, Serial No. 16,697

1 Claim. (Cl. 240—8.2)

This invention relates to lighting or signaling devices for use upon motor vehicles and pertains particularly to the running lights of vehicles.

Motor vehicles of the character of trucks and buses normally have constantly burning running lights located upon the sides of the body and at the back thereof and these lights are unprotected against the sideswiping of other vehicles or fixed objects, in the event that the bus or truck runs too close to the same or runs off of the road thereby putting the lights out of action.

The present invention has for its primary object the provision of a guard or shield for such lights whereby the same will be effectively protected in the event of a collision of any character which would ordinarily result in the tearing off of the light so that the light may be maintained in operation to signal to other vehicles, the presence of the truck or bus, should the same be disabled, or preventing the damaging of the light so that the vehicle, if able to proceed, may do so with its lights burning.

Another object of the invention is to provide a signal light guard which will not interfere with the proper showing of the light fore and aft of the vehicle but, on the other hand, serves to intensify the light by concentrating the rays thereof into beams.

The invention will be best understood from a consideration of the following detailed decription taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a view in side elevation of a portion of a truck over the device applied.

Figure 2 is a section taken on the line 2—2 of Figure 1 showing the guard in top plan.

Figure 3 is a view in elevation of the guard showing a portion broken away.

Figure 4 is a sectional view taken on the line 4—4 of Figure 3.

Referring to the drawing wherein like numerals of reference designate corresponding parts throughout the several views, the numeral 1 indicates a portion of the rear of a truck or bus, the one side of the latter showing the device embodying the present invention mounted upon the chassis. Normally there is mounted upon the vehicle chassis at each side, a light of the character indicated by the numeral 2, which comprises a post 3 and a head 4 upon the post which has the forwardly and rearwardly directed glassed windows or white and red bull's-eyes 5 and 6, respectively.

The present invention consists in the provision of a housing for this light 2, which is indicated as a whole by the numeral 7, which is of tubular formation, preferably of circular cross section and open at its two ends. This housing is preferably formed of a length of steel pipe or tubing and has each end cut obliquely, as indicated at 8. The light unit 2 is mounted in the central part of the tubular housing 7 to stand vertically, preferably, when the housing is mounted with the planes upon which the ends thereof are cut, vertically arranged. In mounting the housing 7 upon the vehicle body, the obliquely cut ends are directed outwardly from the truck body so that the greatest length of the housing lies against the body and securing elements may be passed through the bolt holes 9, which are formed in the wall of the housing, in the manner illustrated, the oblique cutting of the housing ends permitting the introduction of screws or bolts through the housing wall, at right angles to the length of the housing.

In addition to permitting the escape of some light rays laterally, as well as forwardly, and rearwardly, as a result of the cutting of the housing ends obliquely as described, this formation of the housing will tend to turn off any body which may be brought into forcible contact with either end thereof whereas if the end of the housing were cut at right angles to its axis such contact would tend to tear the housing loose from the vehicle body and thus destroy the function of the device.

In order that the efficiency of the light within the housing may not be impaired, the interior surface of the housing may be painted or enameled white so that the best or most efficient reflection of the light rays will be obtained. The formation of the housing will thus tend to concentrate the light rays into a beam and it has been found that as a result, the light of the signal lamp is visible over greater distance than is the case if the signal lamp is unenclosed.

I claim:—

A clearance lamp for application to vehicles, comprising a tubular heavy metal pipe body capable of withstanding heavy crushing strain, the body having its ends cut obliquely on intersecting planes whereby the body has a rear long side and a front short side, the material of the body at each end of the long side having an aperture for the passage of a securing element to secure the lamp to a vehicle, and a lighting unit mounted within the body between the ends of the short side and comprising a casing having two window openings directed oppositely in the body along the length thereof and having a portion extended thru the wall of the body, a lens in each of said window openings, said lenses being differently colored, an electric light source in said casing, means engaging the said extended end of the casing for securing the same to the body wall, and an electric current conductor passing through the said extended end of the casing to supply current to said electric light source.

CLYDE HARTLINE.